United States Patent [19]
Fantone et al.

[11] Patent Number: 5,647,151
[45] Date of Patent: Jul. 15, 1997

[54] MULTI-PURPOSE IMAGE DISPLAY SYSTEMS

[75] Inventors: Stephen D. Fantone, Lynnfield, Mass.; Anthony L. Gelardi, Cape Porpoise, Me.; John A. Gelardi, Kennebunkport, Me.; William T. Fitzsimmons, South Portland, Me.

[73] Assignee: Insight, Inc., Lynnfield, Mass.

[21] Appl. No.: 367,091

[22] Filed: Dec. 30, 1994

Related U.S. Application Data

[63] Continuation-in-part of Ser. No. 222,632, Apr. 1, 1994, Pat. No. 5,603,407, and a continuation-in-part of Ser. No. 338,246, Nov. 14, 1994, Pat. No. 5,588,526.

[51] Int. Cl.⁶ ................................................. G03B 25/02
[52] U.S. Cl. .................. 40/454; 40/427; 40/757; 40/754
[58] Field of Search .................. 40/427, 453, 754, 40/454, 746, 757; 359/619, 626

[56] References Cited

U.S. PATENT DOCUMENTS

| | | | |
|---|---|---|---|
| 3,538,632 | 11/1970 | Anderson | 40/427 |
| 3,568,346 | 3/1971 | Smith | 40/454 X |
| 3,953,869 | 4/1976 | Lo et al. | |
| 3,973,958 | 8/1976 | Bean | |
| 4,044,889 | 8/1977 | Orentreich et al. | |
| 4,120,562 | 10/1978 | Lo et al. | |
| 4,158,501 | 6/1979 | Smith et al. | |
| 4,255,380 | 3/1981 | Bjorkland | 40/453 X |
| 4,420,221 | 12/1983 | Sparks | 40/454 X |
| 4,480,893 | 11/1984 | Fantone | |
| 4,600,297 | 7/1986 | Winnek | |
| 4,863,026 | 9/1989 | Perkowski | |
| 4,869,946 | 9/1989 | Clay | |
| 4,903,069 | 2/1990 | Lam | |
| 5,018,291 | 5/1991 | Pasquale et al. | 40/611 X |
| 5,146,703 | 9/1992 | Boden | 40/454 |
| 5,174,054 | 12/1992 | Politi | 40/152.1 X |
| 5,276,478 | 1/1994 | Morton | |

FOREIGN PATENT DOCUMENTS 2222143  2/1990  United Kingdom.

*Primary Examiner*—Brian K. Green
*Attorney, Agent, or Firm*—Francis J. Caufield

[57] ABSTRACT

Image displays are provided with mechanical and optical features that permit them to be easily configured for a variety of different display modes for a variety of aesthetic or commercial environments while having the capability of displaying multiple images in any of the available modes. The inventive displays are an alternative to and improvement over other methods such as standard picture frames (wood, plastic, metal), pins, buttons, badges, or cards (i.e., baseball cards, souvenirs, etc.).

18 Claims, 12 Drawing Sheets

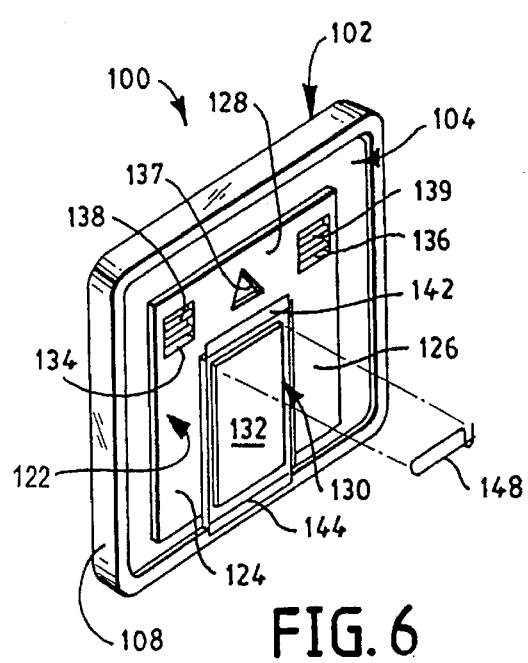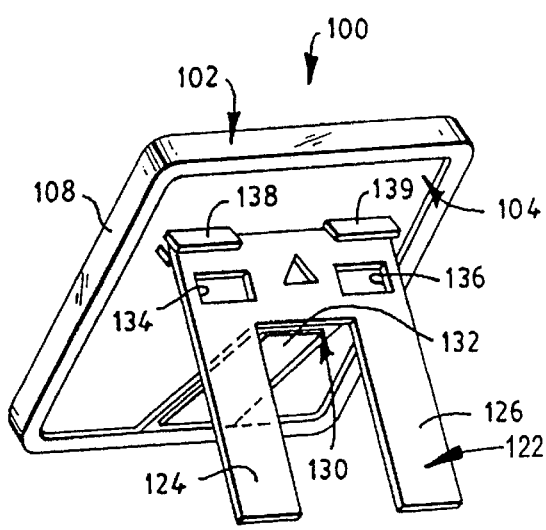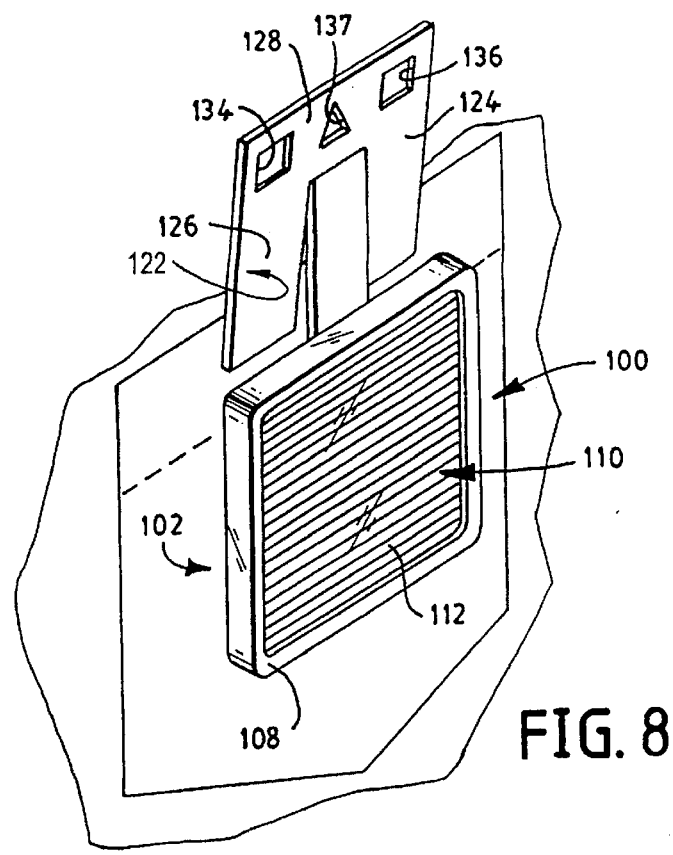

MULTI-PURPOSE IMAGE DISPLAY SYSTEMS

CROSS REFERENCE TO RELATED APPLICATION

This application is a continuation-in-part application of U.S. patent application Ser. No. 08/222,632 filed on Apr. 1, 1994, now U.S. Pat. No. 5,603,407, and of U.S. patent application Ser. No. 08/338,246 filed on Nov. 14, 1994, now U.S. Pat. No. 5,588,526.

BACKGROUND OF THE INVENTION

1. Field of the Invention

This invention relates generally to frames for displaying images and, more particularly, to optical and mechanical arrangements by which such frames can be conveniently configured to provide enhanced views of information such as graphics, photographs, alphanumeric data, and/or other symbolically coded information in a variety of different display modes.

2. Description of the Prior Art

The use of frames for displaying images is a well-established practice. As is well-known, frames play a major role in the visual impact that an image can have; they isolate the important subject matter from its surroundings to focus the viewers attention, aid in composition, and, if carefully chosen, can compliment the contents of an image.

Over the years, any number of materials have been used for frame construction including wood, ceramics, plastics, and metals. Configurations have included those that are adapted to hang from walls, sit on flat surfaces like an easel, or attach to metal surfaces via magnets. Use has also been made of plastic injection molding techniques to fabricate frames.

As visual communications continue to develop and proliferate at ever increasing rates, frames occupy an even greater role in the display of information than they ever had in the past. New technologies in image processing, acquisition, and generation continue to expand and drive the need for convenient and readily adaptable frame modalities that can used with a variety of image generation techniques, as well as the more traditional ones such as photography.

In addition, the number of images available and their use with other types of information such as alphanumeric data, or coded information, have created a need to be able to display as much visual information as possible per unit of display area. Consequently, the display of multiple images via the same display area has become an important requirement for display technology.

While optical approaches have been used in the past for direct magnification of content information about the insides of containers, none have provided more visual access to more information on the same viewable area or, more importantly, different information viewable through the same box surface. For example, British Patent No. GB 2222143 entitled "BOX-LIKE CONTAINER" published on Feb. 28, 1990 discloses the use of a plano-convex, positive cylindrical lens arranged along the hinge edge of a tape cassette or compact disc box for purposes of providing magnification of informational matter carried directly behind it.

U.S. Pat. No. 4,863,026 entitled "STORAGE CASES FOR INFORMATION RECORDING DEVICES", issued on Sep. 5, 1989 discloses a Fresnel lens incorporated in or on the front cover panel of a case for purposes of magnifying information carried on the surface of a program card inserted in the case such that it lies directly beneath the lens. In like manner, U.S. Pat. No. 4,044,889 entitled "COSMETIC CONTAINER INCLUDING INTEGRATED LENS STRUCTURE", issued on Aug. 30, 1977, also shows a Fresnel lens for magnifying tiny underlying information carded on the interior of a cosmetic container.

U.S. Pat. No. 4,863,026 entitled "STORAGE CASES FOR INFORMATION RECORDING DEVICES ", issued in the name of Thomas J. Perkowski on Sep. 5, 1989, discloses a Fresnel lens arranged on the front cover of a magnetic tape, video tape, or compact disc storage box for magnifying information located directly behind the front cover at an appropriate distance.

Similarly, U.S. Pat. No. 4,044,889 entitled "COSMETIC CONTAINER INCLUDING INTEGRATED LENS STRUCTURE", issued to Seymour Orentreich et al. on Aug. 30, 1977, describes the use of Fresnel lens structures for magnifying information located on the interior surfaces of cosmetic containers.

U.S. Pat. No. 5, 189,531 entitled "HOLOGRAM PRODUCTION", issued to Charles E. Palmer et al. on Feb. 23, 1993, describes techniques for forming holographic images in cosmetic compact covers or compact audio or video discs or the like.

In view of the known art, there continues to be a demonstrable need for more effective displays for providing significantly improved visual access to the quantity and variety of images currently available for aesthetic and commercial informational purposes. And, it is a primary object of this invention to fulfill this need.

Another object of the present invention is to provide optical arrangements and mechanical arrangements by which the viewable surfaces of flat display frames may be exploited to provide views of different information by observing those surfaces from slightly different perspectives in a variety of display modalities.

Yet another object of the present invention is to provide optical arrangements by which encoded information may be provided on a viewable surface.

Yet another object of the present invention is to provide optical viewing arrangements for display frames that can be fabricated and assembled via high speed production machinery.

Still another object of the present invention is to provide optical display arrangements by which pseudo-dynamic information may be provided to an observer of a flat image display area.

Another object of the present invention is to provide an optical arrangement employing a lenticulated surface structured to compensate for parallax effects at customary viewing distances.

Yet still another object of the present invention is to provide informational materials, such as booklets and the like, that can be inserted into flat displays utilizing existing equipment while lying flat against a flat panel of the display.

Still another object of the invention is to provide image displays that can easily be configured to fit a variety of image presentation needs.

Another object of the invention is to provide image displays that are simple in construction and can be stacked for automated feeding via high speed assembly machinery.

Other objects of the invention will be apparent and will appear hereinafter in the following detailed description when read in connection with the drawings.

SUMMARY OF THE INVENTION

Image displays are provided with mechanical and optical features that permit them to be easily configured for a variety of different display modes for a variety of aesthetic or commercial environments while having the capability of displaying multiple images in any of the available modes.

The inventive displays are an alternative to and improvement over other methods such as standard picture frames (wood, plastic, metal), pins, buttons, badges, or cards (i.e., baseball cards, souvenirs, etc.). The displays in preferred form comprise two major parts, a front, transparent, lens cover and a rear base in which the mechanical features responsible for enabling the different display modes are integrally formed. These two parts mechanically attach to sandwich an image between them. The cover and the rear base interlock to create a seal between them making the display water resistant so as to protect the interior image. There are virtually no openings into the chamber where the image support resides, making the displays particularly suitable for use in outdoor applications. With this cover/base interlock, the back, which may be in different colors, appears through the cover bezel adding to the aesthetics and perceived value. This feature also affords the possibility for providing customized appearances, especially when different color backings are used.

The cover can be used in two ways. In one preferred way, a lenticulated screen is molded into it which, when used in combination with interlaced images, produces multiple images that are viewable from different angular perspectives. Another use is with a clear lens in the cover to display normal images.

There are four frame mounting options the back is designed to offer. To do this, the base has two main parts, but these are molded as one and connected by a living hinge. The upper portion of the back, aside from securing/protecting the image, has two clips which receive posts from a lower portion. With the lower portion folded straight over and secured to the upper portion, one can use a hole to hang the display from a nail or similar hanger. Secondly, one can provide a magnetic strip to attach the display to metallic surface such as a refrigerator. Another option is to secure a metal pin to the retaining snap for the display to be used as a button, badge, pin, etc. The last option is to unsnap the posts from the upper backing, bend the lower backing, and snap the second pair of posts into the clips; this creates a stand to set the display on a flat surface or unfold the posts to be used as an insert for a pocket.

Other bases can be attached to the cover for different uses. Backings that mate to a common board can be used to create calendars, puzzles, games, etc. These boards can contain many individually framed images or one image framed with many differently styled displays. The displays can be backlit by using a clear base, individually or as a group. A cube or other shape can be made to accept the alternative bases to create children's alphabet cubes or other learning tools/games.

From a manufacturing perspective, the displays are simple to construct. The covers nest on each other, contained by small ribs in each of the four corners. The bases stick on each other. The two major parts press or snap together. Assembled, they nest, preventing scratching on the lens, and easing packing and shipping. There is a large area to place the magnet, and a pin snaps into place after the lower portion of the back has been folded up. There are no sharp corners or edges so the displays can easily be shrink-wrapped, over-wrapped or boxed. The cost and ease of assembly is an improvement over existing buttons and frames. Neither the crystal styrene cover or the polypropylene base are labeled or contaminated in any way, thus making each component recyclable.

Horizontally and vertically oriented lenticulated screens are used in the front cover in combination with interlaced images to convey the differently coded views. These optical features enhance the possibilities for displaying more and different kinds of information on a given display surface area compared with conventional approaches.

The interlaced images may be carried on card inserts in optical registration with the lenticulated surfaces, printed on interior surfaces of the base or front cover, or some combination of all possibilities. Whatever the means for presenting the interlaced images to the lenticulated surfaces used in the invention, it is important to align it within tolerable limits with the longitudinal axes of individual lenticules to assure image quality and separation. However, precise alignment may be softened to provide special effects such as morphing.

In preferred embodiments, the spatial frequency of the lenticulated panels and interlaced images are arranged with respect to one another to compensate for parallax effects which would otherwise be present when the flat panels are observed at customary viewing distances. Preferably, the spatial frequency of the interlaced images are adopted as fixed and the spatial frequency of the lenticulae is made higher by a factor approximately in the ratio of the of the viewing distances to their respective planes, adjusted for refraction effects due to lenticule thickness, material composition, and viewing distance, as needed.

Interlaced images for another preferred embodiment are preferably carried on multipaneled, printed, inserts that are folded to be compliant so that, when inserted into a front cover, they are resiliently urged to lie flat, within tolerances, against the plane containing the loci of focal lines of the lenticulae. Preferably, the panels of the inserts are adjusted in length so that, when folded, a bow is induced in the panel to provide it with a spring action when compressed or to assume a predetermined curve when free standing.

DESCRIPTION OF THE DRAWING

The structure and operation of the invention, together with other objects and advantages thereof, may best be understood by reading the detailed description in connection with the drawings in which unique reference numerals have been used throughout for each part and wherein:

FIG. 6 is a diagrammatic, rear perspective view of the display system of FIG. 1 shown in combination with a pin for attaching it to clothing;

FIG. 7 is a diagrammatic, rear perspective view of the display system of FIG. 1 showing the display configured to operate in its easel display mode;

FIG. 8 is a diagrammatic, front perspective view of the display system of FIG. 1 configured to operate in one of its badge modes;

DETAILED DESCRIPTION

Figure 1:
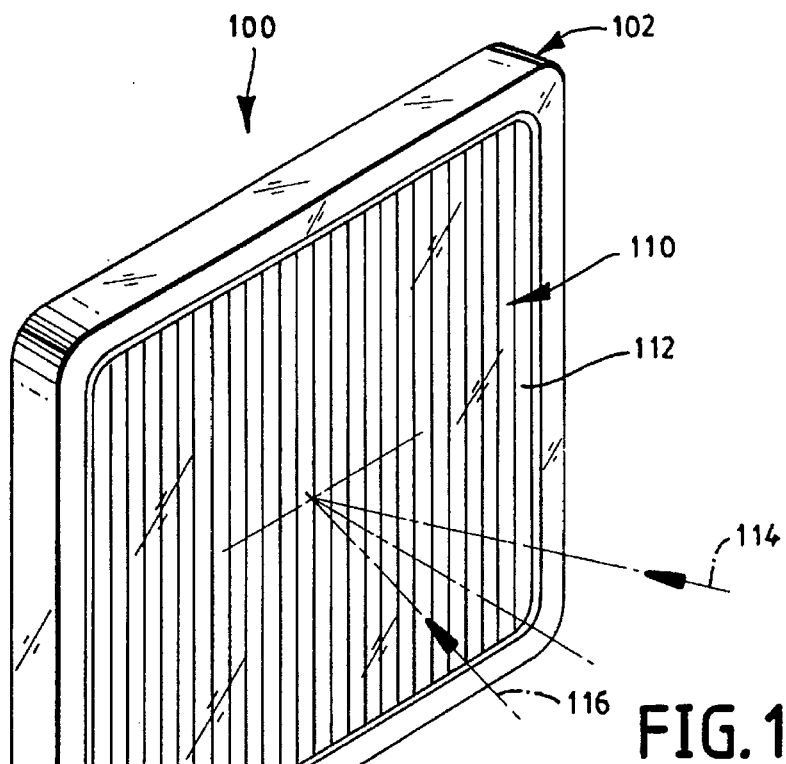
FIG. 1 is a diagrammatic perspective of an inventive display system having a vertically oriented lenticulated front cover.
Figure 9:
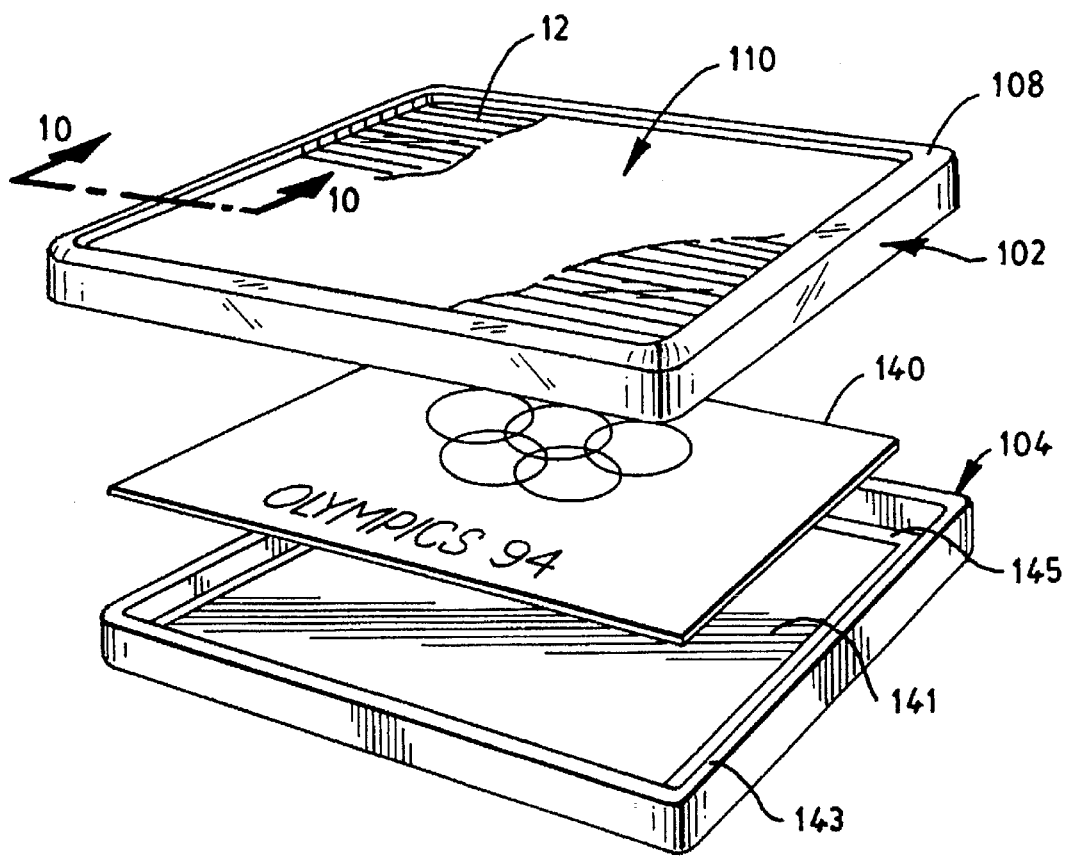
FIG. 9 is a diagrammatic, exploded perspective view of the display system of FIG. 2 showing its major parts in combination with an image bearing substrate.

Referring now to FIG. 1, there is shown an embodiment of the inventive display system designated generally at 100. Display system 100, which is preferably square, comprises a front cover 102 that snap fits to a rear base 104 as best seen in FIG. 9. Inside of display system 100 resides a support for carrying image information such as graphics, pictorials, alphanumeric, and or coded information, as will be more fully explained hereinafter.

Front cover 102 is preferably molded of a transparent, durable plastic such as styrene or polycarbonate and includes a transparent, flat, lenticulated panel 110 in which there are formed in its front surface a plurality of vertically oriented, adjacent individual lenticules 112 which make up a lenticular array or section. While lenticules 112 are shown enlarged many times, it will be appreciated that in practice they are small, having spatial frequencies ranging between, for example, 1 to 10 lenticules per millimeter. Surrounding the perimeter of lenticulated panel 110 is a raised bezel 108 that is also preferably transparent and integrally molded as a unitary structure with the other components comprising front cover 102.

Figure 3:
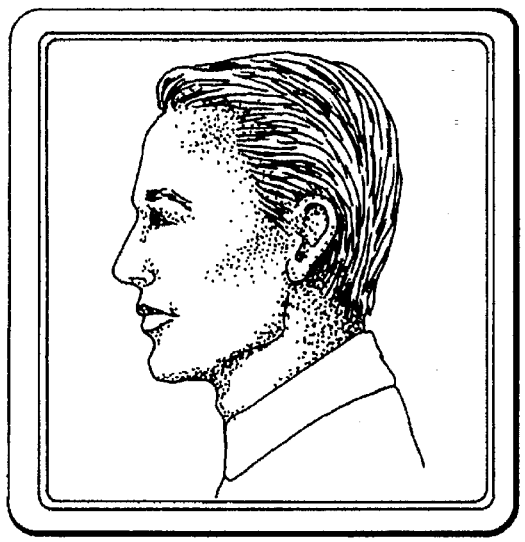
FIG. 3 is a diagrammatic vertical elevational view of an image that may be presented to an observer looking along a first path of observation at the front cover of the display system of FIG. 1.
Figure 4:
FIG. 4 is a diagrammatic vertical elevational view of an image that may be presented to an observer looking along a second path of observation, angularly separated from the first in the horizontal plane, when looking at the front of the display system of FIG. 1.
Figure 5:
FIG. 5 is a diagrammatic vertical elevational view of an alternate image that may be presented to an observer looking along a second path of observation, angularly separated from the first in the horizontal plane, when looking at the front cover of the display system of FIG. 1.

Information, which may be in the form of interlaced printed images, resides in a plane behind front cover lenticulated panel 110, and lenticulated front panel 110 operates in a manner to be described to provide an observer with two different images depending on the angle at which front cover 102 is observed. Because of the vertical orientation of lenticules 112, the two available views are separated in angle in a horizontal plane perpendicular to front cover 102. In FIG. 1, the arrows designated at 114 and 116 indicate by way of example the angular separation between such views, and FIGS. 3 and 4 show examples of different images that an observer may see along such paths of observation. As shown in FIG. 5, an observer may alternatively be presented with a corporate logo, employee information, and signature while viewing along one of the paths, 114 or 116.

While two separate views have been illustrated in connection with the description of the embodiment of FIG. 1, it will be appreciated that more than two views are quite feasible, depending on the number of interlaced images provided. It should also be appreciated that such views can periodically repeat themselves as the angle of view over the surface of the lenticulated surface changes.

Figure 2:
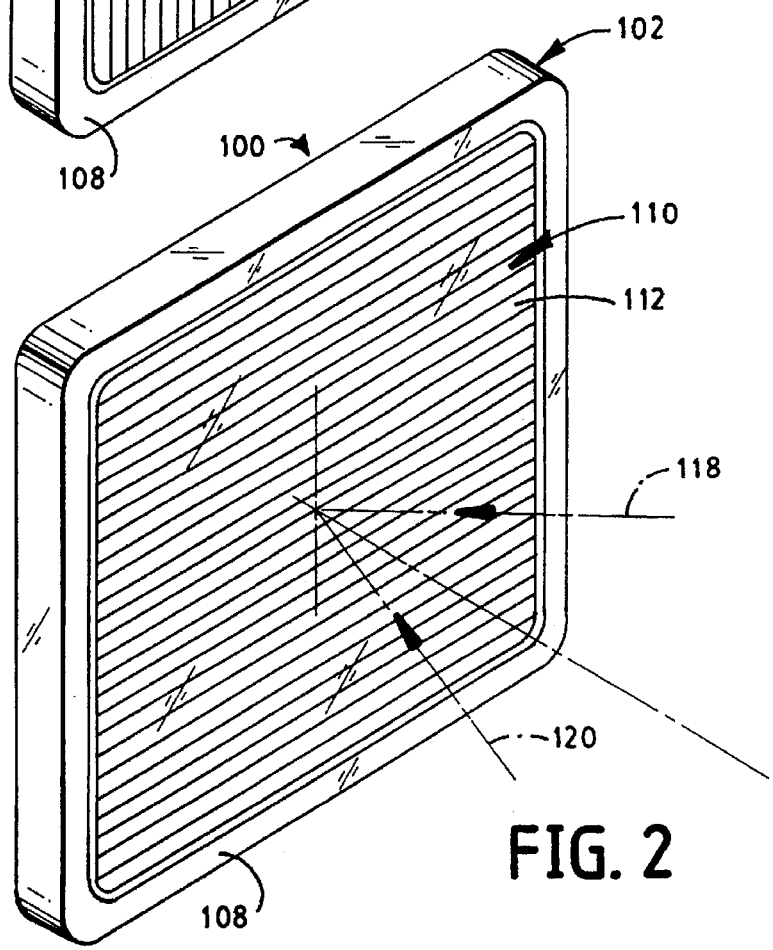
FIG. 2 is diagrammic perspective of an inventive display system having a horizontally oriented lenticulated front cover.

In FIG. 2, an alternate configuration of the invention is presented. Here, front cover 102 of the display system 100 has been rotated by ninety degrees so that lenticules 112 are now horizontally oriented. Lenticules 112 operate as before to provide two informational views that, in this instance, are angularly separated vertically in a plane that is perpendicular to the longitudinal axes of now horizontally oriented lenticules 112. Here, the views, which may be used to present different observable images, are designated as 118 and 120, and the information presented may well be identical to that shown in FIGS. 3, 4, and 5, or something altogether different.

Reference is now made to FIG. 6 which shows a rear perspective view of display system 100. Here, it can be seen that base 104 includes an articulated plate arrangement that allows it to assume a variety of display modes for different display environments. The articulated plate system comprises a "U"-shaped plate 122 and a rectangular plate 130. The "U"-shaped plate 122 includes vertically extending posts, 124 and 126, that are connected by a horizontally extending cross section 128. Rectangular plate 130 is connected to the bottom edge of cross section 128 via a living hinge 142 and to an edge portion of base 104 via another living hinge 144 to permit plate 122 and 130 to be pivoted with respect to one another and with respect to base 104. In this connection, base 104 is preferably molded of a material such as polypropylene to enable the formation of living hinges 142 and 144, as well as to provide resiliency elsewhere in the system to assist in snap fit assembly as will become more apparent later.

Cross section 128 includes three holes, 134, 136, and 137. Holes 134 and 136 provide openings through which clips 138 and 139, respectively, fit, and hole 137 provides a means by which display system 100 may be hanged via nails, or the like, from vertically extending surfaces, such walls. Clips 138 and 139 each comprise spaced apart flexible fingers that are dimensioned in connection with holes, 134 and 136, such that the interaction of the two interfere slightly to hold the articulated plate assembly flat against base 104 as shown in FIG. 6.

If one pulls the articulated plate assembly away from base 104 and rearranges plates 122 and 130 as shown in FIG. 7, display system 100 is now placed in its easel mode so that it can be placed on horizontally extending surfaces for display purposes. Here, the top edge of cross section 128 has been gently forced between the vertically extending, flexible fingers comprising clips, 138 and 139. This reconfiguration of the articulated plate arrangement is quite easily achieved because of the living hinges provided.

When the articulated plate arrangement has been disengaged from the back of base 104, a pin 148, or alternatively an alligator clip, (See FIG. 6) may be slid behind rectangular plate 130 and the articulated plate arrangement reengaged to provide display system 100 with the capability to be "pinned" or "clipped" to a wearer's clothing to act as a badge, such as those for identification purposes.

If the articulated plate arrangement is reconfigured as shown in FIG. 8, vertically extending posts 124 and 126 may be placed into a shirt pocket, or the like to serve as a badge, personal or commercial message display.

A magnet 132 may be included to attach display to a metallic surface. Magnet 132 may be placed onto rectangular 130 via suitable adhesives.

Figure 10:
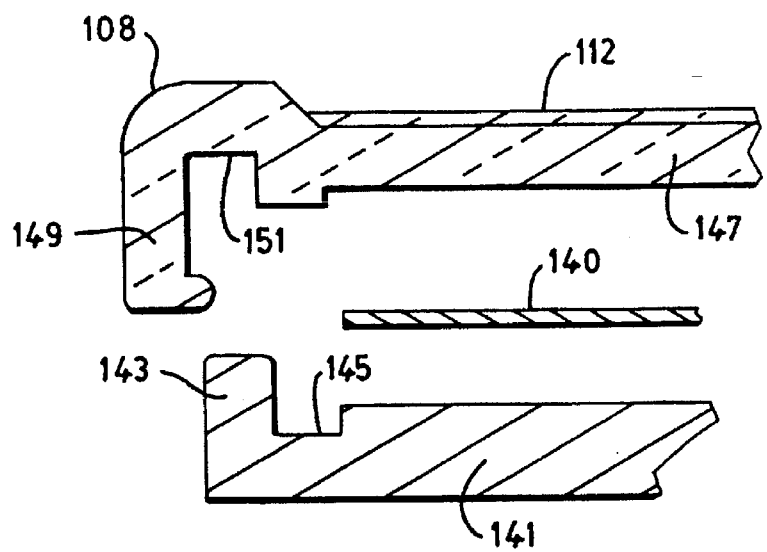
FIG. 10 is a diagrammatic, exploded elevational view of a portion of the display system of FIG. 1 taken generally along lines 10—10 in FIG. 9.

FIGS. 9 and 10 show the major elements of the display 100 in exploded fashion along with an image carrying support 140. Front cover 102 and back 104 snap-fit together to trap image support 140 between them in a water resistant compartment formed by an interlocking tongue and groove arrangement best understood by referring to FIG. 10. As seen there, base 104 comprises a flat plate 141 surrounded by an upwardly extending flange 143. Between flange 143 and plate 141 in a shallow groove 145.

Front cover 102 includes a flat plate 147 which carries the lenticules 112 and which together comprise the lenticulated panel 110. Surrounding the edge of flat plate 147 is the bezel 108 which includes a downwardly depending flexible wall 149 and is separated from plate 147 by a groove 151 that is deeper than groove 145 and is dimensioned to receive flange 143. Configured as shown, front cover 102 snaps around base 104 to trap image support 140 flat against the rear surface of flat plate 147 to retain the image flat against the loci of focal lines of lenticules 112. One or more edges of image support 140 may be used to align the interlaced images carried on it with the longitudinal axes of lenticules 112 within the required tolerances.

Each lenticule 112 operates in a well-known manner as a cylindrical lens to form line images in one azimuth corresponding to its longitudinally extending axis. Image support or information card 140 preferably bears an interlaced image, i.e., the images of the various views to be presented to a viewer broken up into tiny adjacent image strips, alternately one image segment form one view and so on over the entire image. Such interlaced images are placed behind lenticules 112 so that different combinations of them can be seen along the different perspectives; each lenticule 112 providing a view of part of the whole image which collectively are perceived as a synthesized whole by the observers visual system without notice of the individual lenticules themselves because of their size in relation to the visual acuity of the eye.

The image support or informational card 140 may be positioned laterally and vertically through the expediency of the square format of the preferred embodiment of display system 100. However, it will be understood that other shapes for the display may also be used. For example, rectangles or other polygonal shapes or other geometries with a finite number of axes of symmetry would be suitable. Circular mounts and artwork can be accomodated by introducing simple keying or orienting features which locate the artwork relative to the lenticules.

Advantageously, base 104 may be made of different colored material to frame images in the colors most suitable for their content or to create special color effects since the color of base 104 is visible through transparent bezel 108.

Figure 12:
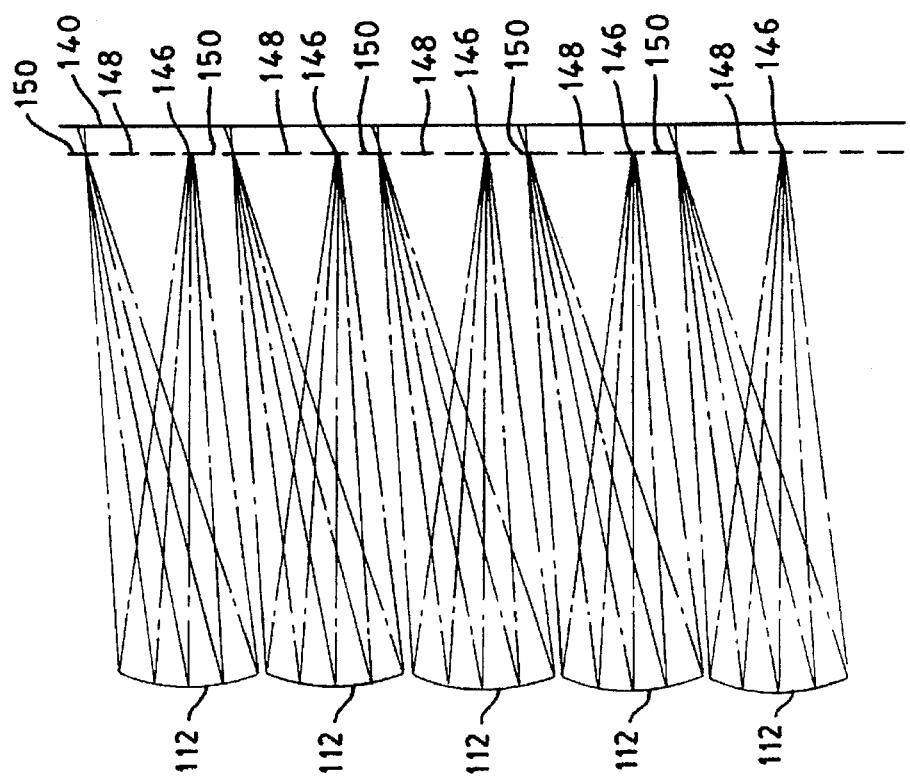
FIGS. 11 and 12 are diagrammatic drawings taken transverse the longitudinal axes of lenticulated panels used in the inventive display systems, tracing the paths various light rays take in traveling to different segments of interlaced images formed on image beating cards used in the inventive display systems.
Figure 11:
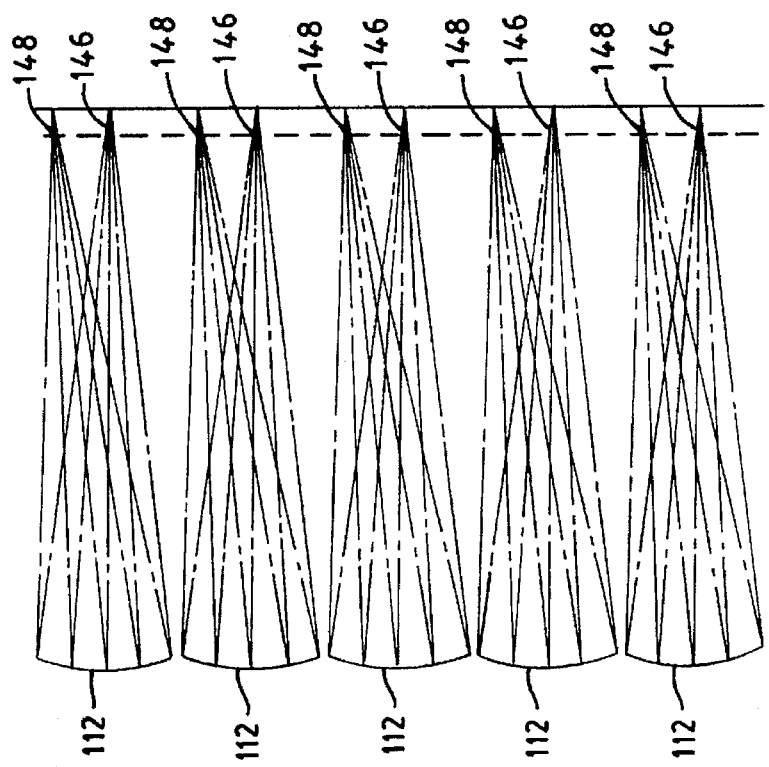

FIGS. 11 and 12 show the principle of operation of the lenticular panels used in the display systems of the invention. Both figures are traces illustrating the paths that certain light rays take in traveling from different portions of the interlaced images used in the invention to provide the different views for a particular lenticule design. Here, the ray traces were done for lenticules 112 that are made of styrene with an index of refraction of 1.59, have a radius of 0.0285 inches, and an apical focal distance of 0.058 inches, i.e., the distance from the front surface on the axis to the optimal focus of a lenticule, here the dashed line, which represents the interlaced image. The image card actually resides behind this location by a distance of 0.003 inches so that there is an air gap of this amount between the front surface of a card (140) and the dashed line.

In FIG. 11, an observer looking straight along the axis of lenticules 112 sees behind each lenticule 112 a different segment of the whole image where each segment is designated at 146. If the observer looks along a line of sight that is at 10 degrees with respect to the axis, image segments designated at 148, which correspond to a different image, can be seen while those designated at 146 cannot.

In FIG. 12, image segments 150 are seen at an angle of observation inclined to the axis at 20 degrees so this may represent yet another message or a repeat of a previous message or image slightly shifted.

Figure 13:
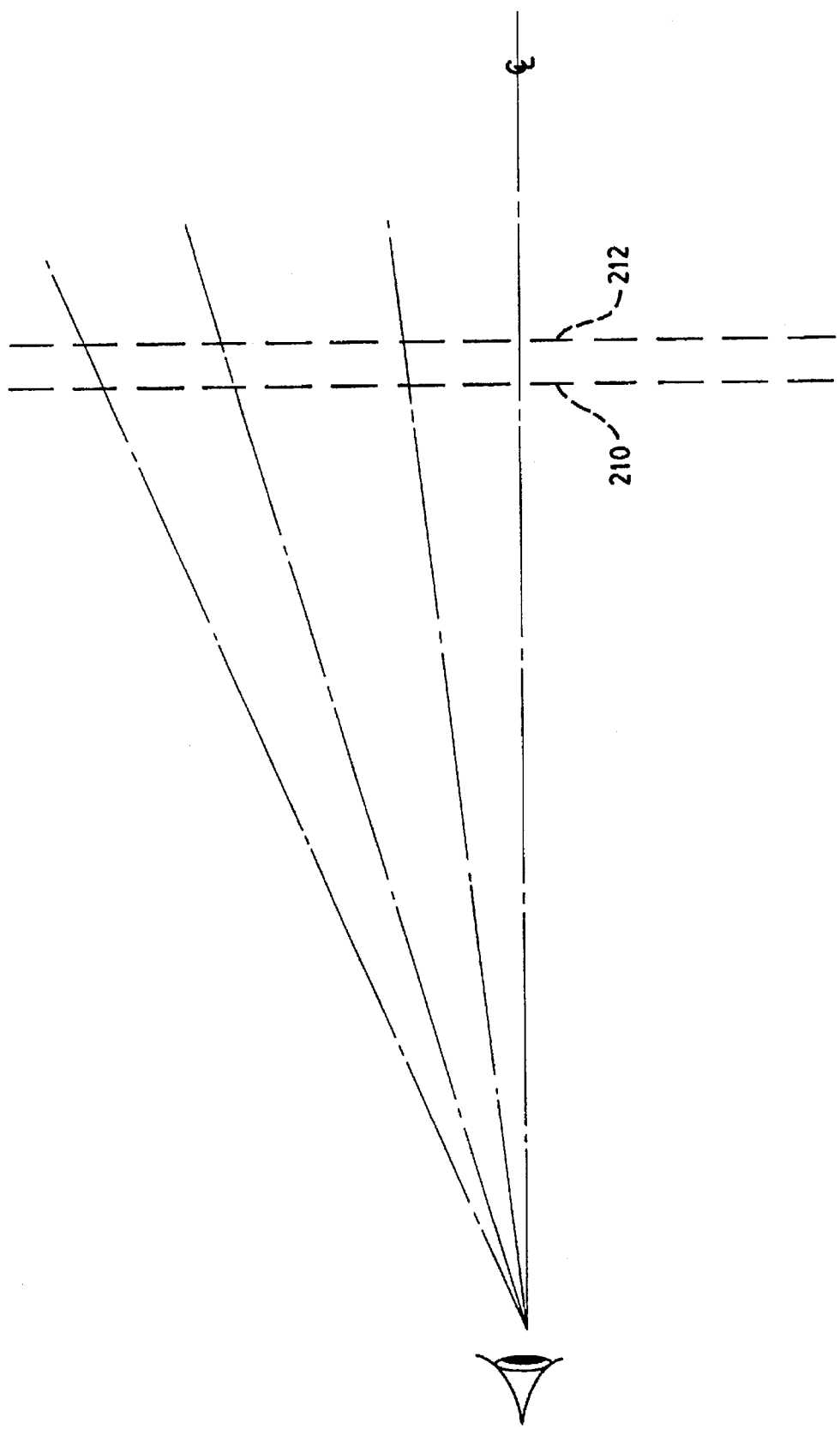
FIG. 13 is a diagrammatic view illustrating the nature of parallax effects that are corrected by certain features of the invention.

Reference is now made to FIG. 13, which illustrates the parallax effect that can occur in using the invention if the size of the display area becomes large in relation to the interpupillary distance of the eye or the viewing distance is correspondingly small in relation to the overall image size. The parallax effect comes about because of a displacement of the chief ray passing through the center of each lenticule 112 with respect to its corresponding image segment as the angle of observation of a lenticule increases compared with the normal to that lenticule. The result is that every chief ray, if not corrected for this effect, does not pass through its correct interlaced image segment. The visual result is a softness or bluriness in changing from one view to the next, or poor separation between views. The phenomenon is shown heuristically in FIG. 13. Let 210 represent the lenticules with a given spacing (assume thin lens theory applies) and 212 represent the interlaced images at the same spatial frequency of the lenticules. Here, the dashes for the interlaced images in 212 can comprise just one image or several images in the allocated space. For purposes of the illustration, they can be assumed to represent one image segment, but the argument applies if they represent more than one.

As can be appreciated, the lenticules and images line up perfectly just like one picket fence behind another, and when one looks through a lenticule normal to it (the lenticules are transparent), one sees a corresponding image segment right behind it. However, when viewing 212 at some angle other than normal incidence, it is clear that one no longer sees the proper corresponding image segment. Instead, the line of sight begins to walk away from the proper image segment as the viewing angle increases until the proper image is missed altogether. This results in a partial view of both images simultaneously, a generally undesirable result.

Figure 14:
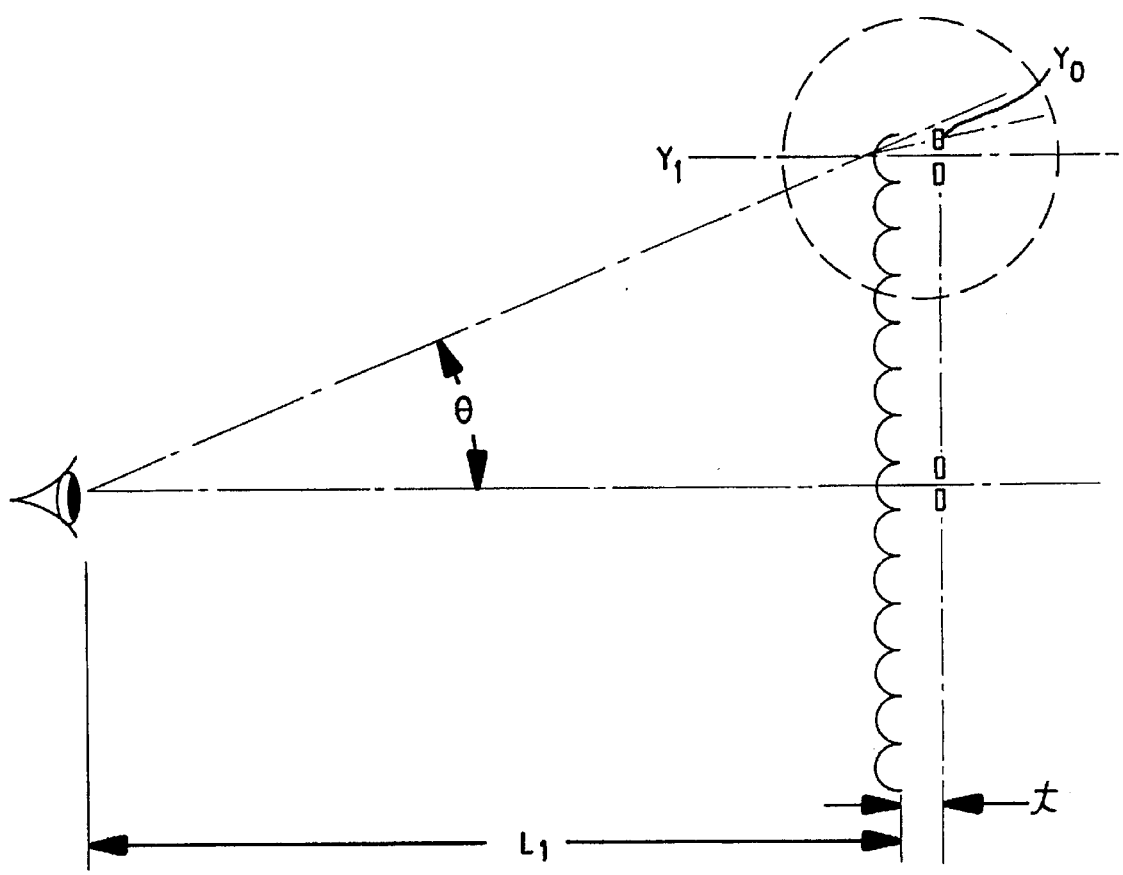
FIG. 14 is a diagrammatic illustration showing in more detail how the parallax effects of FIG. 13 occur as a result of differences in the angle of perspective from which an observer "sees" different segments of interlaced images of the invention.
Figure 15:
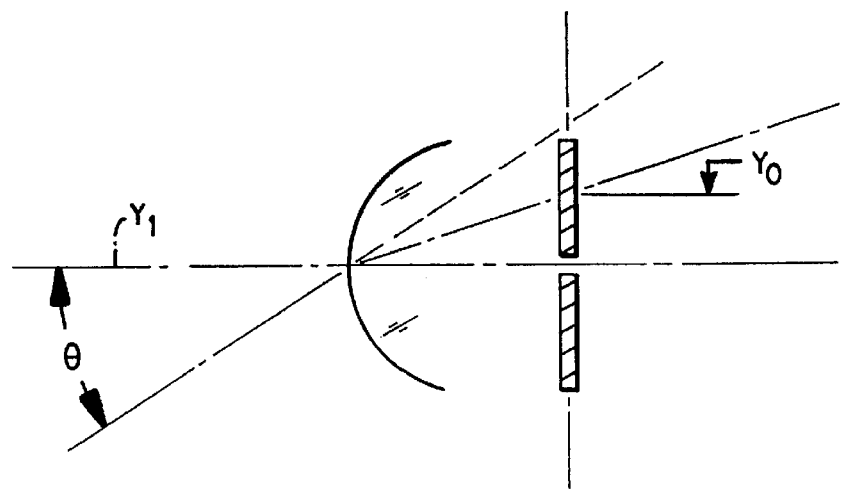
FIG. 15 is a diagrammatic illustration showing the origins of a visual parallax effect that exists without the corrective features of the invention.

FIGS. 14 and 15 show in more quantitative terms exactly by what amounts the chief ray "walkoff" problem is. More particularly, let $y_o$ be the ray height of the chief ray for any lenticule as a function of the angle of observation, $\theta$ and vertical position of the y-intercept of an incoming ray. Then $\theta_o=\theta/n$, where n is the index of refraction of the lenticular material and $L_1$ is the viewing distance. Then, $$y_o=y_1(1+t/nL_1)$$

If one lets, $f_o$=the spatial frequency of the interlaced images, then to compensate for the progressively larger errors in $Y_o$ with increasing viewing angle, then, $f_1$, the spatial frequency of the lenticules is given by:

$$f_1=f_o(1+t/nL_1)$$

Thus, the parallax effect may be compensated for exactly for any assumed viewing distances or optimized over a range of viewing distances.

While the preferred way of correcting for parallax effects is to increase the spatial frequency of the lenticules to progressively drop the center of each lenticule downwardly with increasing angle, it is to be understood that the spatial frequency of the artwork may also be adjusted or both can be altered to address the parallax problem. However, it is somewhat easier to build the correction into the molding tool and use available printing techniques to achieve the spatial frequency of the interlaced images.

Figure 16:
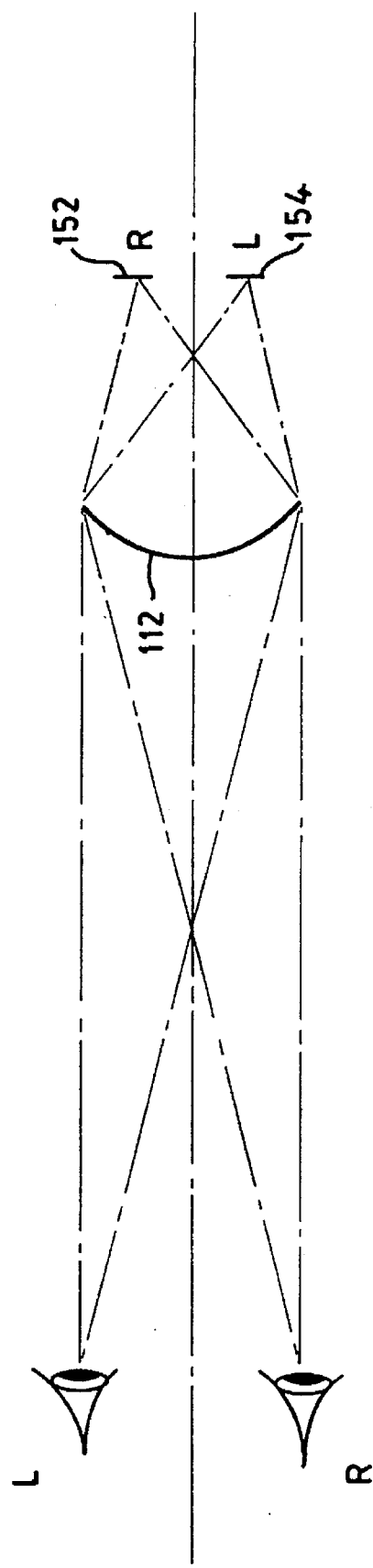
FIG. 16 is a diagrammatic plan view illustrating the principle of operation of the lenticulated surfaces of the invention used for presenting stereo images.

FIG. 16 diagrammatically shows how the interlaced images and lenticules may be used to provide stereo image sets, such as stereo pairs, so the view of the display system front cover may be a stereo image. Here, the system is arranged so that the left eye sees a left stereo image segment behind the right side of a lenticule 112 while the right eye sees a right stereo image segment behind the left side of a lenticule 112. The overall effect is for the right and left eyes to have presented to them full left and right stereo image pairs. Here, again, parallax effects can be corrected in the manner previously described. If it is desired to provide special effects that simulate morphing, then the interlaced images should be made to slightly overlap so that, as the display rotates past the visual system, the images gradually blur from one to another.

Figure 17:
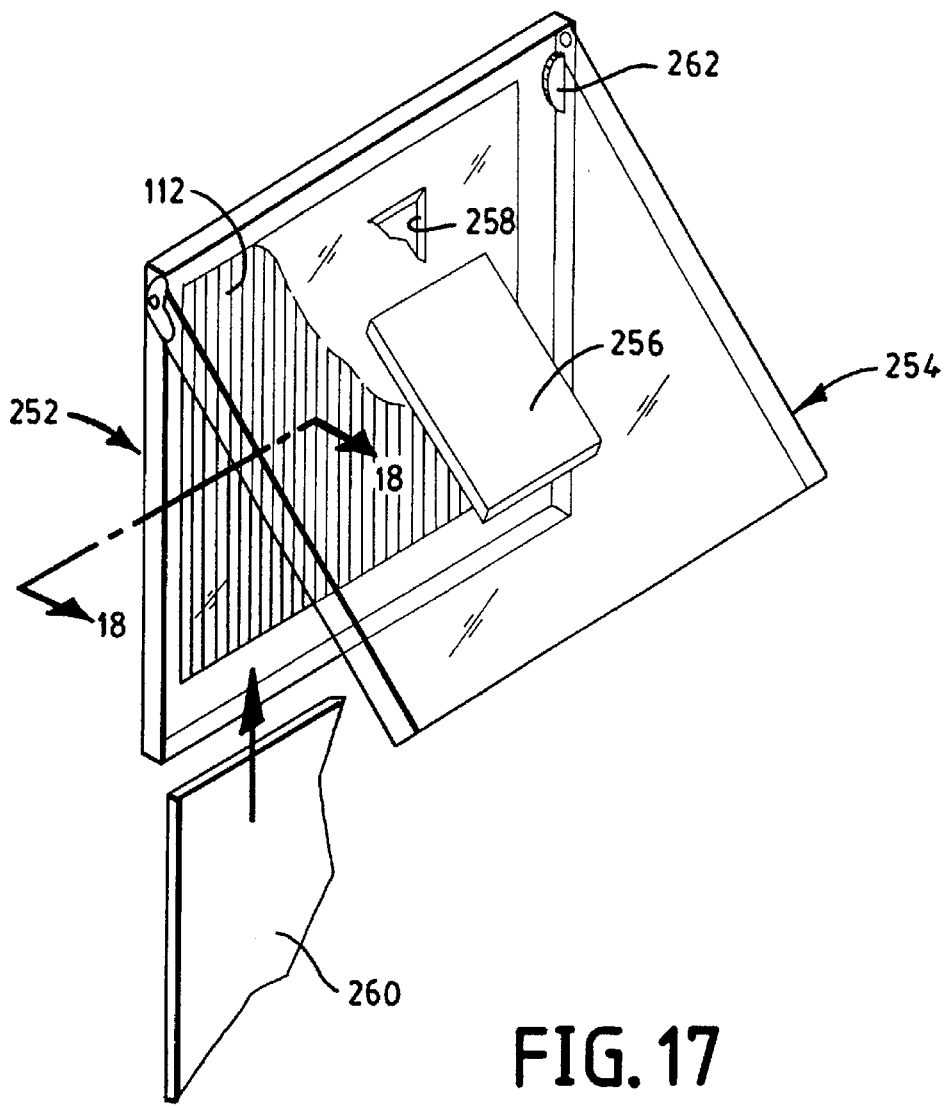
FIG. 17 is a diagrammatic perspective view of another preferred embodiment of a display system of the invention.
Figure 18:
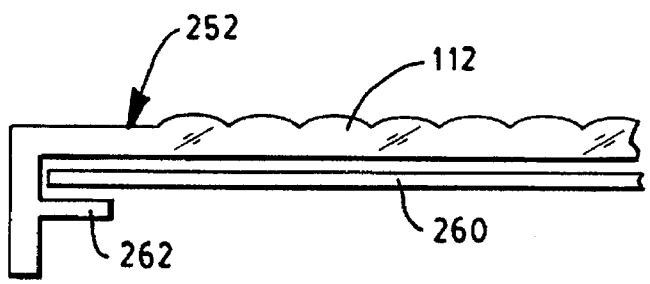
FIG. 18 is a diagrammatic, elevational, sectional, view of a portion of the front cover of the display system of FIG. 17 taken generally along lines 18—18 of FIG. 17.

Referring now to FIGS. 17 and 18, there is illustrated an alternative embodiment of the display system of the invention. Here, the system is designated generally as 250 and is an adaptation of a conventional compact disc (CD) jewel box. It comprises a front cover 252 having lenticules 112 as before. A rear base 254 pivotally hinges to the front cover so that, when separated, the display serves as an easel as shown in FIG. 17.

Rear base 254 may also carry a magnet 256 and is provided with a mounting hole 258. Here, a compliant image support 260 is supported against the rear surface of lenticulated front cover 252 via tabs 262 in a manner to be more fully described.

Where it is desired to utilize existing high-speed, industry wide equipment to insert informational or image carrying materials, such as printed materials, in display system 250 of the invention, or similar displays where the image support is not sandwiched in between two compressive flat plates as in the previous embodiment, it must be kept in mind that such materials must still be aligned within acceptable visual tolerances with respect to the loci of focal lines of the lenticular surfaces, i.e., they must be flat over the area of visual interest, and must not be twisted, or tilted, with respect to the longitudinal axes of the lenticules. More particularly, image inserts such as booklets must be self flattening and preferably fit into the space provided between the retention tabs 262 and the flat surface carrying the lenticular screen so that current molds do not need to be modified significantly to accommodate the inventive image materials.

The depth of space available between the retention tabs and the flat surface carrying the lenticulars for conventional CD jewel boxes is approximately 0.085 to 0.090 inches. With typical paper thickness used for booklets, for example, running at about 0.005 to 0.006 inches, it is clear that, even for booklets consisting of multiple panels, a substantial amount of available space must be filled to hold any image materials in place and be properly aligned with the lenticules both axially and laterally. Moreover, since any informational insert, particularly those for use in the front cover, is suspended over a large span between oppositely facing tabs, it must be stiff perpendicular to this direction and resilient in a direction opposite so that it will flatten against the lenticulars over their whole area within the tolerances dictated by the depth of focus of the optics. For a circle of confusion of about 0.005" (visual acuity) and acrylic, this depth of focus is about plus or minus 0.008 inches.

Figure 19:
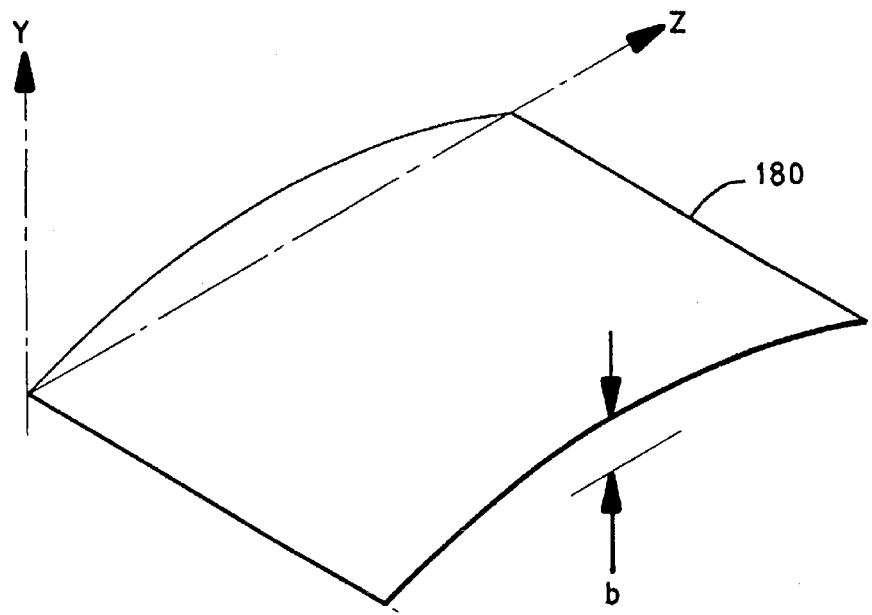
FIG. 19 is a diagrammatic perspective view of a bowed or curved compliant or resilient image carrying insert in accordance with the teachings of the invention.

To solve this problem several inventive embodiments of informational inserts have been made based on the principle illustrated in FIG. 10, which shows an insert that has resiliency or compliance when in a free standing state. As seen, the insert shown at 180 has a natural bow or curvature, b, when free standing. If one pushes on insert 180, it will compress and return to its free state when the force is released, i.e., it exhibits elastic behavior. Consequently, insert 180 is structured with properties that provide it resiliency in one azimuth while adding stiffness along the azimuth perpendicular to it (See FIG. 19). The insert is stiff in the x-y plane and resilient or compliant in the y-z plane.

Figure 20:
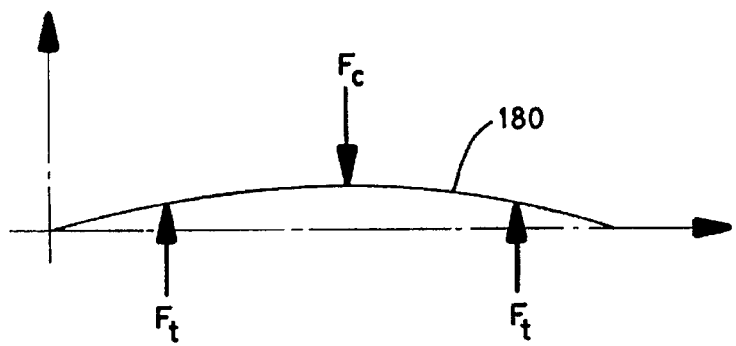
FIG. 20 is a diagrammatic side elevational view illustrating the loading on the insert of FIG. 19 when placed in a display system of the invention.
Figure 21:
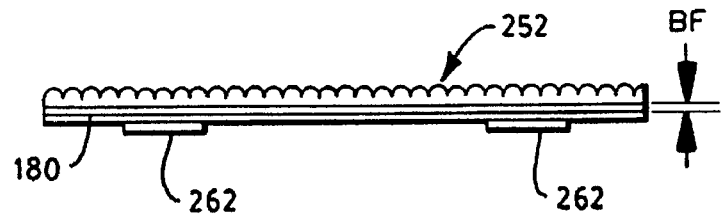
FIG. 21 is a diagrammatic elevational view illustrating the geometric relationships between the insert of FIG. 19 and the rear surface of a lenticulated cover and tabs of a display system of the invention when subjected to the forces illustrated in FIG. 20, particularly showing that the insert takes on a flattened shape with respect to the loci of the back focal lines of the lenticulated cover.

When such a structure interacts with the rear surface of the lenticular front cover and the tabs the static reactions at the tabs, $F_r$, and the resultant force bearing against the lenticulated surface caused by the cover, $F_c$, (See FIG. 20) introduce moments tending to flatten the art work out as shown in FIG. 21. Here, BF represents the foci of back focal lines of the lenticules on cover 252. Obviously, the thickness of such inserts also plays a role in filling up the space between the tabs and lenticulated surface as well and must, in conjunction with its resilient properties be accounted for.

Figure 22:
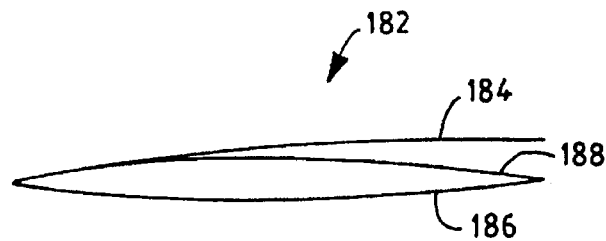
FIG. 22 is a diagrammatic side elevational view of a preferred, multipaneled booklet that may be used in the practice of the invention showing that, in its free standing folded configuration, the booklet is bow shaped and compliant.
Figure 23:
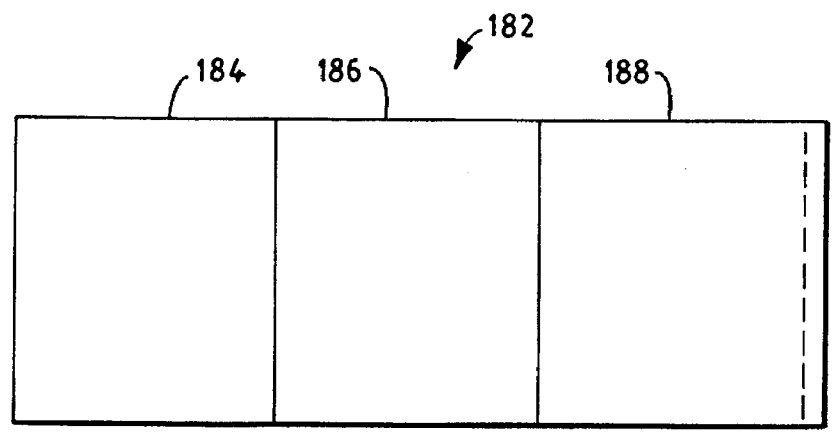
FIG. 23 is a diagrammatic, unfolded plan view of the booklet of FIG. 22.

Various approaches to making such inserts with the needed properties have been found useful. FIG. 22 shows a double folded, multiple panel, booklet 182 having three panels, 184, 186, and 188, having sharp creases between them, with the free edge of inwardly folded panel 188 entering the first crease formed between panel 184 and 186. Here, the lengths of the panels are selected so that, when folded, the edge of the last panel folded interferes with the first crease to cause the last panel to buckle under the induced compression set up in this way. This, in turn, creates the compliance needed, and the compliance may be adjusted as required by a simple length adjustment. For example, as shown in FIG. 23, the last panel to the fight (188) may be made longer than the two to the left of it (184 and 186), or alternatively, in one preferred embodiment, the outer two panels may be of the same length and the middle one made shorter. Clearly, this approach makes for a reliable method of controlling resilient properties by controlling length instead of the characteristics of the creases and material properties on which information is printed.

Figure 24:
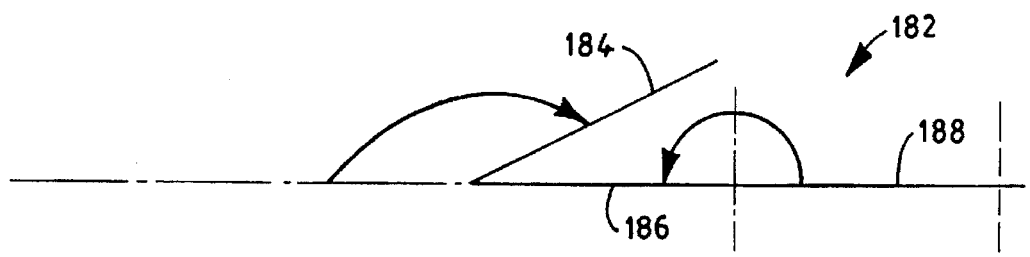
FIG. 24 is a diagrammatic illustration showing how the multipaneled booklet of FIGS. 22 and 23 is folded to achieve the configuration of FIG. 22.

FIG. 24 shows the sequence for folding booklet 182. Panel 184 is first folded on top of panel 186 with a sharp crease formed between them. Then, panel 188 is folded over panel 186, between panel 184 and 186, so that it is sandwiched between them. Again, a sharp crease is formed between these latter two.

Figure 25:
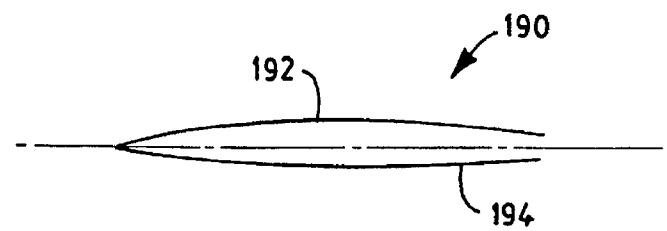
FIG. 25 is a diagrammatic, side elevational view of another embodiment of a compliant image carrying insert of the invention.

FIG. 25 represents a single fold insert 190 having two panels 192 and 194, both of which bow individually to form a collective bow. Here, the inside surface of the material forming insert 190 is provided with a coating causing the material to cuff towards the coated side. The insert can be practiced with either a gentle or sharp crease. Instead of a coating, it is also possible to create this configuration with suitable heat treatment such as ironing.

Figure 26:
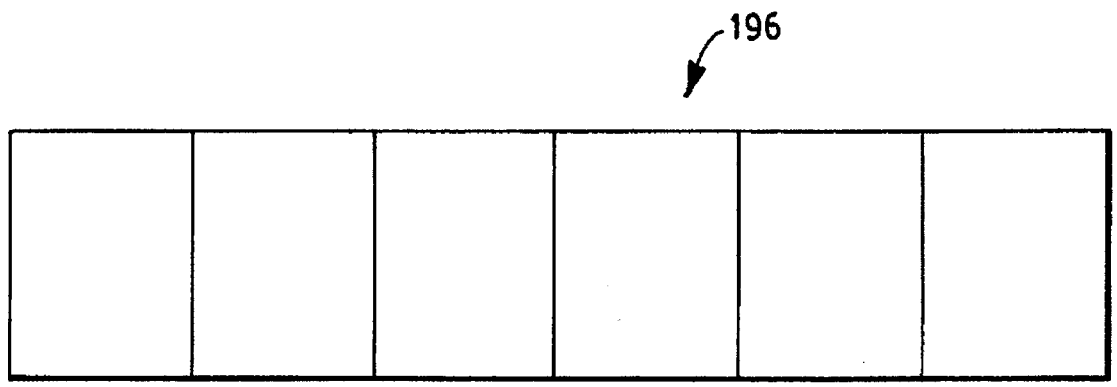
FIG. 26 is a diagrammatic plan view illustrating yet another multipaneled booklet of the invention.

FIG. 26 shows a six panel booklet that is about 0.030 inches thick in its folded condition. In use, this booklet must be configured so that at least one panel interferes with the crease between two others to provide the resilient properties needed, and this may be achieved empirically if needed.

Figure 27:
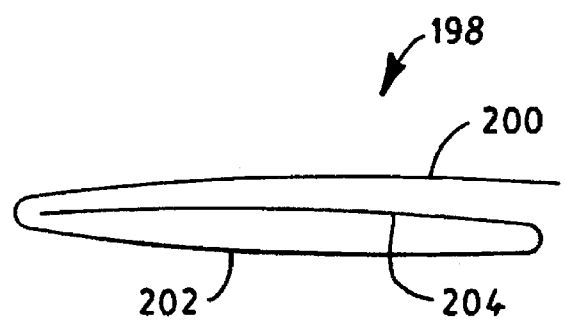
FIG. 27 is a diagrammatic, side elevational view of yet another multipaneled compliant insert of the invention.

FIG. 27 shows a multipanel insert consisting of panels 200, 202, and 204. Here, instead of sharp creases between panels, gentle creases are used with the free end of the inwardly folded panel 204 not entering the first crease. The material properties of the insert and the gentler crease operate to provide spring sections that tend to separate the panels, forcing them to want to unfold. This type of approach can be made to either expand on its own to fill available space or be compressed within the space available. In either case, the art work is flattened with respect to the lenticulated surface.

It will be understood that tab placement can be adjusted as needed to induce the proper bending moments to cause informational inserts to flatten out against the optics. However, to change the current tab positions would be a very costly proposition which can be avoided with the present invention.

Figure 28:
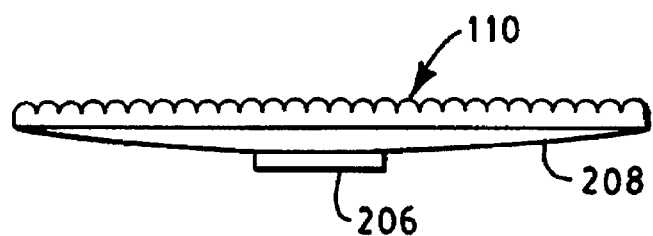
FIG. 28 is a diagrammatic, side elevational view of another embodiment for the display system of the invention illustrating how one tab may be used with a compliant image carrying insert that is bowed oppositely than others of the invention.

FIG. 28 uses a single central tab in conjunction with a single panel with a curl coating. It bends oppositely to the others. Non-curl versions could also be used provided the cud were in the right direction.

It is also possible to use combinations of folded printed materials in conjunction with flexible, thin springs. For example, panel 188 of FIG. 24 may instead be a separate piece of polymeric material heat treated to induce a gentle curvature to provide it with springiness. Such a piece could be assembled with the informational material prior to insertion in a box. Moreover, such springy inserts need not be placed between folded panels but could just as well be located behind inserts as a separate piece.

In addition to the need to have the image carrying inserts flat with respect to the optics, it must also be parallel to the longitudinal axes of the lenticules to within limits or adverse visual effects can occur in the form of ripples that become apparent across the face of the viewed field. What has been found preferable is to keep the interlaced images parallel to the longitudinal axes of the lenticules to within ½ or less the width of a single segment of an interlaced image resident behind a lenticule over the length of the art work of interest, and this holds true for both embodiments. Consequently, if the art work is long, this tolerance is more demanding than if short. However, what is interesting is that the art work can slide perpendicular to the lenticules without objectionable visual problems; one just sees the different views in different orders. Even so, the tilt must remain within the above limits to avoid rippling. This means that the edges of multiply folded panel inserts must be straight to within this tolerance, or at least one of them used for registration must be straight, while the others may deliberately be skewed in the opposite direction to avoid any conflict in this regard. Interestingly, while the inserts can move in parallel fashion transverse to the longitudinal axes of the lenticules without introducing visual artifacts, so long as any tilt is kept within bounds, edges skewed in the direction opposite that of the reference can provide springiness in the plane of the insert to keep it in place perpendicular to the axes of the lenticules. Otherwise, the effect of slight movement in this plane is to simply change the order in which one sees the different views.

Also, it is to be understood that the various inserts described may be rotated ninety degrees and still work even though the bowing is now also at ninety degrees to those inserts shown.

It should also be understood that it is not necessary to form the lenticulated wall sections of the invention as unitary structures integrated with structural walls themselves since it is within the teaching of the invention to attach separately formed lenticulated wall sections to otherwise smooth wall sections by using suitable adhesives or other means of attachment. Moreover, it will be understood that the lenticulated structures of the invention, including compensation for parallax effects, may be integrated with the front, back, and side wall surfaces along with interior surfaces, as well.

In addition, it should be clear that the displays of the inventive embodiments may be scaled up or down in size. Moreover, other bases can be attached to the cover for different uses. Bases that mate to a common board can also be used to create calendars, puzzles, games, etc. These boards can contain many individually framed images or one image framed with many differently styled displays. The displays can be backlit by using a clear base, individually or as a group. A cube or other shape can be made to accept the alternative bases to create children's alphabet cubes or other learning tools/games.

Those skilled in the art may make other changes to the invention without departing from the scope of its teachings.

Therefore, it is intended that the embodiments described herein be considered as illustrative and not be construed in a limiting sense.

What is claimed is:

1. An image display system for presenting multiple images to an observer, said display system comprising:

a flat cover including at least one transparent lenticulated section, said transparent lenticulated section having formed therein a plurality of lenticules;

a printed insert bearing at least two preprinted interlaced images, said preprinted interlaced images being located in a plane substantially parallel to and in substantial physical contact with said transparent lenticulated section so that said preprinted interlaced images are in optical registration with said lenticules of said transparent lenticulated section of said flat cover, said printed insert and said transparent lenticulated section of said flat cover being structured and arranged with respect to one another to provide different images to an observer looking at said transparent lenticulated section from different angular perspectives; and a base for releasably mating with said flat cover to provide a protective enclosure for said printed insert and to hold it in place with respect to said lenticules, said printed insert comprising a flat image carrying substrate and said flat cover and said base being structured and arranged with respect to one another to snap together and trap said image carrying substrate between them in optical registration with said lenticules of said transparent lenticulated section.

2. The display system of claim 1 wherein said transparent lenticulated section is square in shape so that it can be rotated to provide to an observer vertically or horizontally oriented varying images in combination with correspondingly rotated image information.

3. The display system of claim 1 wherein said flat cover is fabricated of transparent material and said base of opaque, colored material so that said color of said base material is visible as an image border when viewing said flat cover.

4. The display system of claim 1 wherein said base includes an articulated plate system that is moveable between several different positions to permit a user to configure said display system for use in several different display modes including a wall hanging mode, an easel mode, a badge mode, a pin mode for attachment to clothing, and a mode in which it can be attached to a metallic surface.

5. The display system of claim 1 wherein said flat cover and said base include a complementary configured interlocking tongue and groove arrangement by which they can be snap fitted together to provide a water resistant compartment in which said printed insert resides.

6. The display system of claim 1 wherein each of said lenticules has a focal length, a focal line, and a plano rear surface located substantially at the focal line of a lenticule, said focal lines of said lenticules collectively defining a focal plane substantially coincident with said plano rear surfaces of said lenticules and wherein said interlaced images of said printed insert are located substantially at said focal plane.

7. A multipurpose image display system for presenting images to an observer, said display system comprising:

a flat cover including at least one transparent lenticulated section, said transparent lenticulated section having formed therein a plurality of lenticules;

a printed insert bearing at least two preprinted interlaced images, said preprinted interlaced images being located in a plane substantially parallel to and in substantial physical contact with said transparent lenticulated section so that said preprinted interlaced images are in optical registration with said lenticules of said transparent lenticulated section of said flat cover, said printed insert and said transparent lenticulated section of said flat cover being structured and arranged with respect to one another to provide a view of an image to an observer looking at said transparent lenticulated section; and a base for releasably mating with said flat cover to provide a protective enclosure for said printed insert and to hold it in place with respect to said lenticules, said base including an articulated plate system that is moveable between several different positions to permit a user to configure said display system for use in several different display modes including a wall hanging mode, an easel mode, a badge mode, a pin mode for attachment to clothing, and a mode in which it can be attached to a metallic surface, said printed insert comprising a flat image carrying substrate and said flat cover and said base being structured and arranged with respect to one another to snap together and trap said image carrying substrate between them in optical registration with said lenticules of said transparent lenticulated section.

8. The display system of claim 7 wherein said transparent viewing section and said base are square in shape so that they can be assembled in either of two orthogonal directions.

9. The display system of claim 7 wherein said flat cover is fabricated of transparent material and said base of opaque, colored material so that said color of said base material is visible as an image border when viewing said flat cover.

10. The display system of claim 7 wherein said flat cover and said base include a complementary configured interlocking tongue and groove arrangement by which they can be snap fitted together to provide a water resistant compartment in which said means for providing image information resides.

11. The display system of claim 7 wherein each of said lenticules has a focal length, a focal line, and a plano rear surface located substantially at the focal line of a lenticule, said focal lines of said lenticules collectively defining a focal plane substantially coincident with said plano rear surfaces of said lenticules and wherein said interlaced images of said printed insert are located substantially at said focal plane.

12. An image display system for presenting multiple images to an observer, said display system comprising:

a flat cover having a perimeter and including at least one transparent lenticulated section, said transparent lenticulated section having formed therein a plurality of lenticules and said perimeter of said flat cover being surrounded by a bezel;

printed image bearing insert bearing at least two interlaced images; and a base for releasably mating with said flat cover and including complementary configured means for trapping said printed image bearing insert between them and aligning said interlaced images thereon in a plane substantially parallel to and in physical contact with said transparent lenticulated section so that said preprinted interlaced images are in optical registration with said transparent lenticulated section of said front cover, said printed image bearing insert and said transparent lenticulated section of said flat cover being structured and arranged with respect to one another to provide different images to an observer looking at said transparent lenticulated section from different angular perspectives, said printed image bearing insert comprising a flat image carrying substrate and said flat cover and said base being structured and arranged with respect to one another to snap together and trap said image carrying substrate between them in optical registration with said lenticules of said transparent lenticulated section.

13. The display system of claim 12 wherein said interlaced images of said printed insert and said transparent lenticulated section are further configured and arranged with respect to one another to compensate for parallax effects that would otherwise arise when viewing interlaced images through lenticulated surfaces from ordinary viewing distances or where the size of the image in relation to the viewing distance created parallax effects by introducing a large variation in the angular perspective from one vantage point.

14. The display system of claim 12 wherein said transparent lenticulated section is square in shape so that it can be rotated to provide to an observer vertically or horizontally oriented varying images.

15. The display system of claim 12 wherein said flat cover is fabricated of transparent material and said base of opaque, colored material so that said color of said base material is visible as an image border when viewing said flat cover.

16. The display system of claim 12 wherein said base includes an articulated plate system that is moveable between several different positions to permit a user to configure said display system for use in several different display modes including a wall hanging mode, an easel mode, a badge mode, a pin mode for attachment to clothing, and a mode in which it can be attached to a metallic surface.

17. The display system of claim 12 wherein said flat cover and said base include a complementary configured interlocking tongue and groove arrangement by which they can be snap fitted together to provide a water resistant compartment in which said printed image bearing insert resides.

18. The display system of claim 12 wherein each of said lenticules has a focal length, a focal line, and a plano rear surface located substantially at the focal line of a lenticule, said focal lines of said lenticules collectively defining a focal plane substantially coincident with said plano rear surfaces of said lenticules and wherein said interlaced images of said printed image bearing insert are located substantially at said focal plane.

* * * * *